No. 795,927. PATENTED AUG. 1, 1905.
C. H. PALMER & J. W. DENMEAD.
MACHINE FOR MAKING AND SANDING BOX SHUCKS OR SLIDES.
APPLICATION FILED MAR. 14, 1899.

4 SHEETS—SHEET 1.

Witnesses:
Jas. E. Hutchinson.
Henry C. Hazard.

Inventors.
Charles H. Palmer
John W. Denmead
by Pindle and Russell
their attorneys No. 795,927. PATENTED AUG. 1, 1905.
C. H. PALMER & J. W. DENMEAD.
MACHINE FOR MAKING AND SANDING BOX SHUCKS OR SLIDES.
APPLICATION FILED MAR. 14, 1899.

4 SHEETS—SHEET 4.

Witnesses:—
Jas E Hutchinson
Henry C. Hazard

Inventors.
Charles H. Palmer
John W. Denmead
by Prindle and Russell
their Attorneys

UNITED STATES PATENT OFFICE.

CHARLES HENRY PALMER AND JOHN WILLIAM DENMEAD, OF BARBERTON, OHIO, ASSIGNORS TO THE DIAMOND MATCH COMPANY, OF CHICAGO, ILLINOIS, A CORPORATION OF ILLINOIS.

MACHINE FOR MAKING AND SANDING BOX SHUCKS OR SLIDES.

No. 795,927. Specification of Letters Patent. Patented Aug. 1, 1905.

Application filed March 14, 1899. Serial No. 709,040.

*To all whom it may concern:*

Be it known that we, CHARLES HENRY PALMER and JOHN WILLIAM DENMEAD, of Barberton, in the county of Summit, and in the State of Ohio, have invented certain new and useful Improvements in Machines for Making and Sanding Box Shucks or Slides; and we do hereby declare that the following is a full, clear, and exact description thereof, reference being had to the accompanying drawings, in which—

Figure 1:
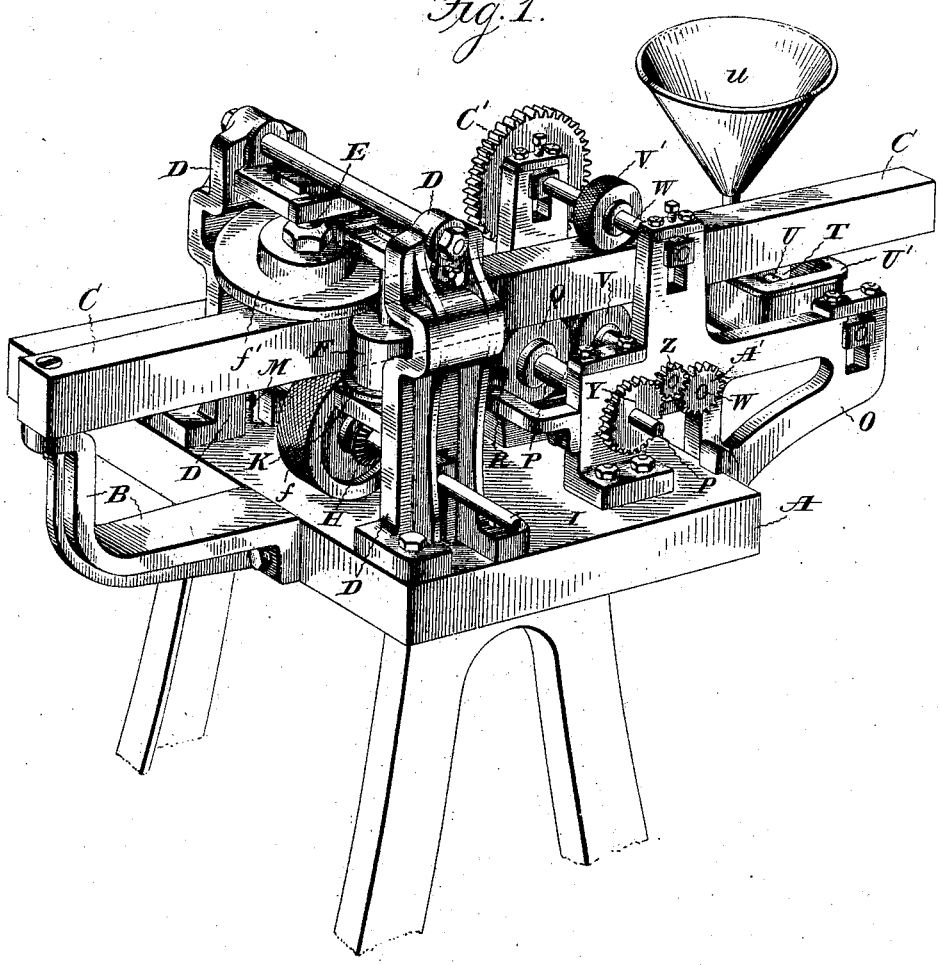
Figure 2:
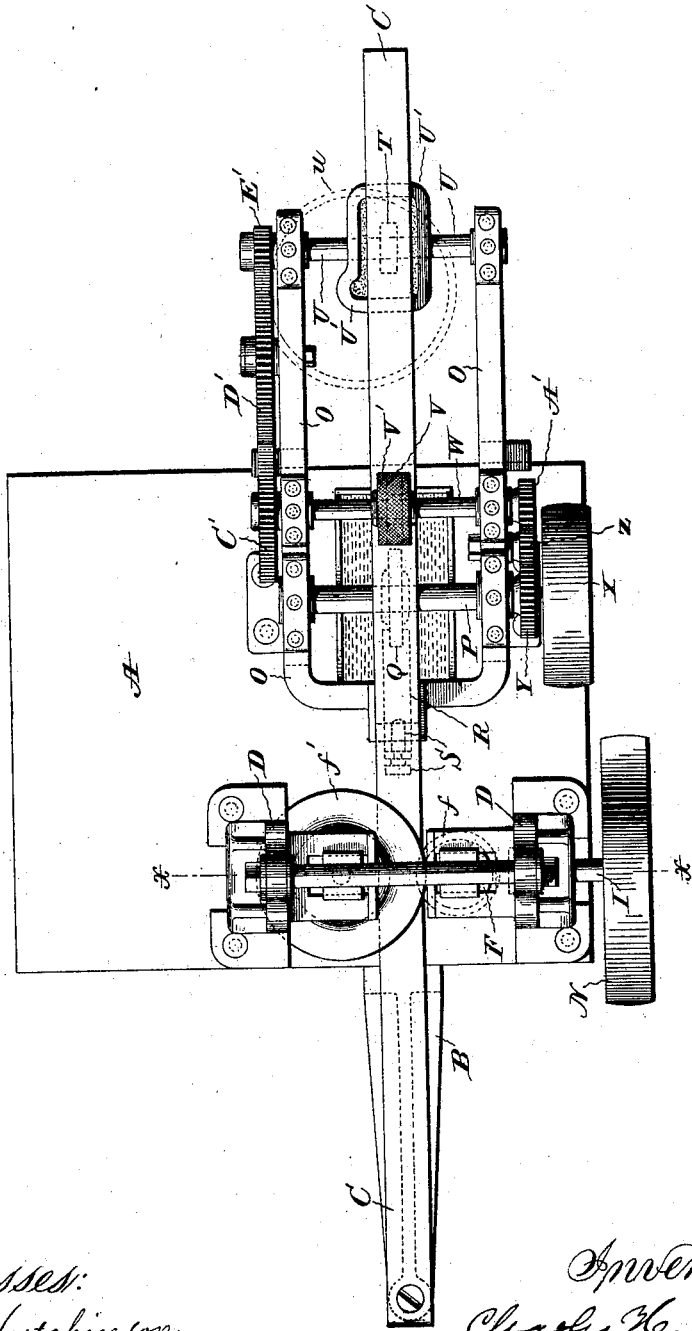
Figure 3:
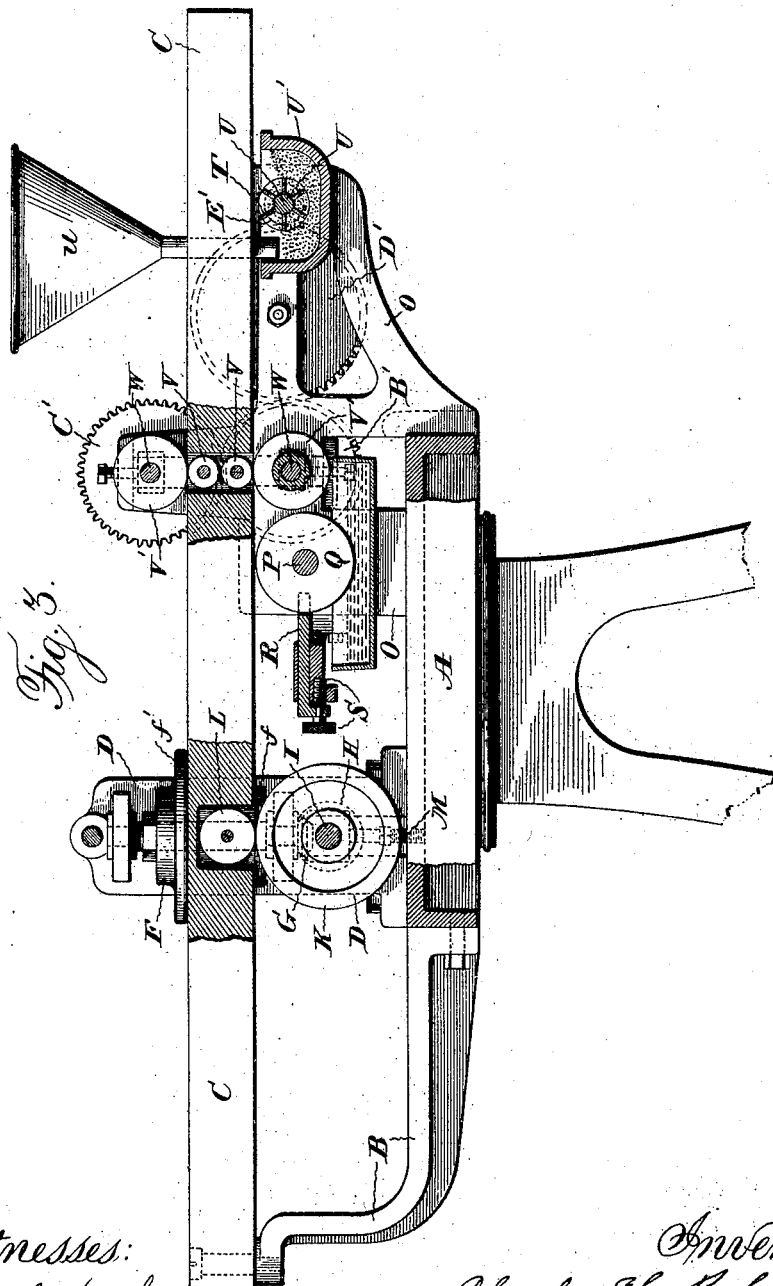
Figure 4:
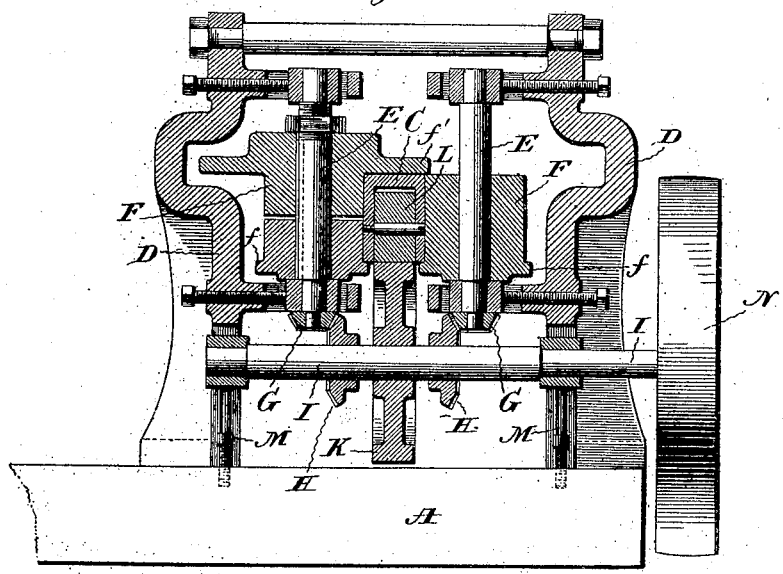
Figure 5:
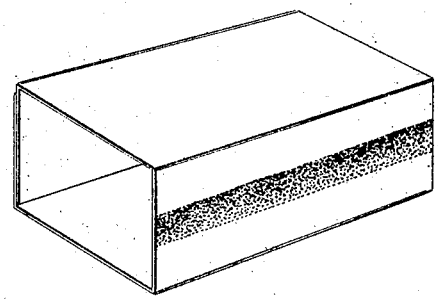

Figure 1 is a perspective view of a machine embodying our invention; Fig. 2, a top plan view thereof; Fig. 3, a longitudinal section of said machine; Fig. 4, a cross-section thereof on the line $x$ $x$ of Fig. 2; and Fig. 5, a detail view, in perspective, of the shuck or slide made by the machine.

Letters of like name and kind refer to like parts in each of the figures.

The object of our invention is to provide an improved machine for the manufacture of the shucks or slides of the kind of boxes composed of two telescopic parts; and to this end said invention consists in the machine and in the parts thereof constructed and combined substantially as hereinafter specified.

Our invention has been made with reference more particularly to machines for making the shucks or slides for match-boxes, said shucks or slides being in the form of flat-sided tubes with sand or other abrading material applied to the exterior of one side to provide a scratch-surface for matches. It is to be understood, however, that the invention is not limited to machines for making parts of match-boxes or any particular kind of boxes.

In the machine illustrated in the drawings the operating parts are mounted upon a bed A, that is supported on suitable legs. Bolted to one end of said bed is an angle-shaped bracket B, one member of which is horizontal and the other vertical and extending upward to a point in a plane above the top of the bed. Fastened at one end to the upper end of said vertical member is a horizontal bar C, that extends across and parallel with the bed-top to a point beyond the end of the bed opposite that to which the bracket B is fastened. Said bar C is rectangular in cross-section the same as size and shape in cross-section the same as the interior of the shuck or slide to be formed and constitutes a mandrel or former on which said shuck or slide is made.

Journaled in suitable bearings in two standards D and D upon the bed A, at the end to which the bracket is fastened, are two vertical shafts E and E, one being supported by one standard and the other by the other standard and said shafts being upon opposite sides of the bar C and parallel to said sides. Fixed upon each of said shafts is a roll F, the periphery of which is so close to the adjacent side of the bar C as to press against the same interposed pasteboard or other box material. At the lower end of each of said rolls is an annular flange $f$, that extends slightly beneath the under side of said bar. The upper end of one roll is level with the top of the bar C, while the upper end of the other roll has an annular flange $f'$ of such diameter that it reaches across the top of the bar with its under side in position to bear upon the pasteboard or other box material interposed between the bar and flange. In the case of the roll with the two flanges it is desirable, for convenience in removing and replacing it, to divide it, as shown, at a point between the two flanges. The lower corner of the flange $f'$ is slightly rounded to facilitate the passage of the box material.

At the lower end of each shaft is a bevel-pinion G, which meshes with a bevel gear-wheel H upon a horizontal shaft I, journaled in bearings or boxes mounted in the two standards D and D. Upon said shaft I, directly beneath the bar C, is a wheel K, between the periphery of which and the periphery of a smaller wheel L, journaled in a slot in the under side of the bar C, the portion of the box material at the under side of the bar is gripped. As said wheels are feed-wheels, their peripheries are knurled or roughened to enable them to grip the box material. The bearings or boxes of the shaft I are slidingly mounted in the standards D and D and rest, respectively, upon vertical adjusting-screws M and M to enable the raising and lowering of the wheel K relative to the wheel L. A band wheel or pulley N on one end of the shaft I provides means whereby the feed-wheel K and the rolls F and F may be revolved.

It is to be understood that a slide-blank of pasteboard or heavy paper of rectangular form scored in parallel lines to permit ready folding and provided along one edge with glue or paste is placed by hand around and made to conform to the bar C, with the edge provided with glue overlapping the opposite edge on the top side of the bar and is then pushed along the bar until the lower side of the slide is gripped by the feed-wheels. The latter moving it along to the rolls F and F, its sides are pressed by said rolls against the sides of the bar and by the roll-flanges against the top and bottom thereof, being made to accurately and permanently conform to the shape of the bar. The top flange $f'$ by a pressing and rubbing action on the overlapping parts causes the tight adhesion thereof by reason of the glue previously applied.

If the slide is for use with other than matchboxes, it is complete after passing beyond the rolls F and F and may be slid off the bar C. If for a match-box, however, it is desirable to apply sand or other rough material to form a scratch-surface, and the machine is therefore provided with mechanism for the application of such material to the slide before it is removed from the bar C. Such mechanism will now be described. Bolted to the bed A is a frame O, composed of two side and an end piece, and in bearings mounted in the side pieces is journaled a shaft P beneath the bar C and carrying at a point directly below the latter a glue-applying wheel Q, that carries glue on its periphery from a suitable receptacle and applies it to the under side of the slide. The amount of glue carried by the wheel Q is gaged by a plate R, that has one end forked to straddle said wheel and at its other end is engaged by an adjusting-screw S, that is tapped into a threaded opening in the end piece of the frame O. The plate R is slidingly mounted in a groove or way in said end piece. After leaving the glue-wheel the slide is moved along the bar C to a sand-applying wheel T, of usual construction, mounted beneath the bar C on a shaft U, that is journaled in bearings in the sides of the frame O. Said wheel T revolves in a trough-like sand-receptacle U', suitably supported by the frame O, to which sand may be supplied through a funnel $u$.

Between the glue and sand applying devices there are two shuck or slide feeding devices consisting each of a pair of rolls, one of which pair acts on the top part of the shuck or slide and the other on the bottom part thereof. One roll V of each pair is journaled in a vertical slot in the bar C and the other roll V' of each pair is mounted on a shaft W, journaled in bearings or boxes supported by the sides of the frame O. The boxes or bearings of each of the shafts P, W, and U are vertically adjustable to place their respective slide-engaging wheels and rolls in proper relation to the bar C. The peripheries of the feed-rolls are knurled or otherwise roughened, and in the lower roll V' is an annular groove $v$ of a width to avoid contact of the roll with the glue on the slide.

Power to drive the glue-wheel is applied to a band-wheel X on the shaft P, and the lower pair of feed-rolls V and V' is driven from the shaft P by means of a gear-wheel Y thereon meshing with an idler Z, that in turn meshes with a gear A' on the lower shaft W. A gear-wheel B' on the lower shaft W, meshing with a like wheel C' on the upper shaft W, transmits power to the upper pair of feed-rolls. By means of an idler D', meshing with the gear B' and with a pinion E' on the sand-wheel shaft T, the sand-wheel is rapidly revolved to throw the sand from the receptacle U to the glue-containing surface of the shuck or slide.

The distance between the feed-wheels K and L and the two sets of feed-rolls V and V' is such that with two shucks or slides on the portion of the bar C between said wheels and rolls and placed end to end the forward shuck or slide is engaged by the feed-rolls V and V' while the other one is still engaged by the feed-wheels K and L. The forward shuck or slide is thus pushed onward by the other until engaged by the feed-rolls V and V', and it is therefore insured that there will be no stoppage of the shuck or slide in its passage over the glue-wheel.

After the sand is applied to the slide the latter is slid off the bar C. As indicated above, several slides are in course of construction at the same time on the bar C.

Having thus described our invention, what we claim is—

1. The combination of a bar or mandrel, along which the shuck or slide is movable, flanged forming-rolls, two sets of feed devices at different points along the bar, a glue-applying device between said feed devices, and a sand-applying device, substantially as and for the purpose described.

2. The combination of a bar or mandrel that is rectangular in cross-section, and forming devices for coöperating therewith consisting of rolls on opposite sides thereof, one of said rolls having flanges that, respectively, overlap opposite sides of the bar and the other roll a flange that overlaps but one of said sides, substantially as and for the purpose described.

3. The combination of a bar or mandrel that is rectangular in cross-section, and forming devices coöperating therewith consisting of rolls on opposite sides thereof, said rolls having flanges that overlap the remaining sides of the bar, a feed-roll engaging one of said remaining sides between the said flanges, and a roller located in a cavity in the bar and coacting with said feed-roll.

4. The combination with a bar or mandrel that is rectangular in cross-section, forming-rollers on opposite sides of such bar or mandrel, said rollers having flanges that coöperate with the remaining sides of said bar or mandrel, and a feed-roller mounted between such forming-rollers, with its periphery adjacent a side of the bar or mandrel, substantially as and for the purpose described.

5. The combination with a bar or mandrel that is rectangular in cross-section, forming-rollers on opposite sides of such bar or mandrel, one of said rollers having a flange that extends entirely across one face of said bar, and a flange extending partially across another face thereof, and the other of said rollers having a flange that extends partially across said last-mentioned face, and a feed-roller mounted to revolve adjacent to said last-mentioned face of the bar or mandrel, substantially as and for the purpose described.

In testimony that we claim the foregoing we have hereunto set our hands this 20th day of February, 1899.

CHARLES HENRY PALMER.
  JOHN WILLIAM DENMEAD.

Witnesses:
 TOM A. PALMER,
 B. C. ROSS.